Jan. 19, 1971          J. H. THELIN          3,555,877

ABRASION TESTING APPARATUS AND METHOD

Filed Oct. 18, 1968          4 Sheets-Sheet 1

INVENTOR.
JACK HORSTMANN THELIN

Jan. 19, 1971    J. H. THELIN    3,555,877
ABRASION TESTING APPARATUS AND METHOD
Filed Oct. 18, 1968    4 Sheets-Sheet 2

INVENTOR.
JACK HORSTMANN THELIN

Jan. 19, 1971 J. H. THELIN 3,555,877
ABRASION TESTING APPARATUS AND METHOD
Filed Oct. 18, 1968 4 Sheets-Sheet 3

INVENTOR.
JACK HORSTMANN THELIN

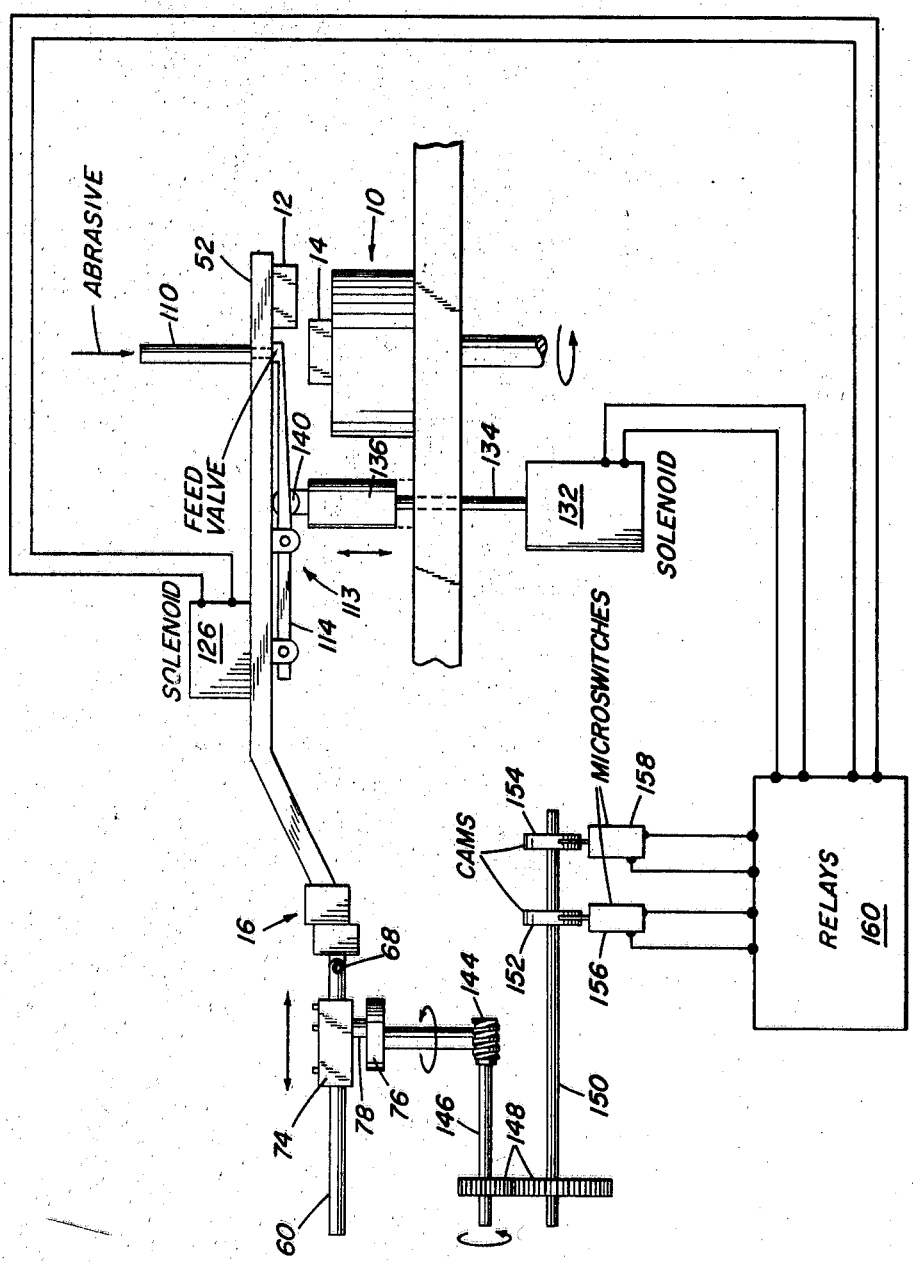

United States Patent Office 3,555,877
Patented Jan. 19, 1971

3,555,877
ABRASION TESTING APPARATUS AND METHOD
Jack Horstmann Thelin, Somerville, N.J., assignor to American Cyanamid Company, Stamford, Conn., a corporation of Maine
Filed Oct. 18, 1968, Ser. No. 768,805
Int. Cl. G01n 3/56
U.S. Cl. 73—7                                                         7 Claims

ABSTRACT OF THE DISCLOSURE

The apparatus and method disclosed are for testing the abrasion resistance of materials, particularly elastomers such as rubber. A pair of samples of the materials to be tested are mounted respectively to a rotating table and a reciprocating arm of the apparatus. The samples are placed in face-to-face contact and respectively rotated and reciprocated to provide the desired abrasive action. At predetermined intervals the samples are separated and an abrasive introduced between their contacting surfaces to accelerate abrasion. The operation of the apparatus is automatically controlled by an electromechanical system and the apparatus may be constructed to simultaneously perform a plurality of tests.

BACKGROUND OF THE INVENTION

Wear due to abrasion is a major factor acting to shorten the service life of moving parts. This type of wear affects most moving parts whether they be formed of elastomers, plastics, metals, ceramics or other types of materials; it is, however, of particular interest in the choice of elastomeric materials such as rubber for use in tire treads, conveyor belts and the like. These materials are usually tested before use to determine how long they will last in service under abrasive conditions.

Service testing under actual conditions of abrasive use to determine when failure will occur is a long and tedious process since many materials have service lives measured in months or even years. Accordingly, short term tests have been devised which accelerate abrasive conditions. Data on abrasion resistance are obtained from these short term tests which are used to estimate actual service life.

In practice, however, it has been found that the data obtained from prior art abrasion tests is often unreliable as an indication of actual service life. For example, it has been difficult with prior art apparatus to consistently apply reproducible abrasive conditions to separate samples so that an accurate determination of their relative abrasion resistance can be made. Further, the abrasion testing of elastomerics such as rubber has been complicated since elastomers tend to smear and clog the abrading surface, changing its ability to abrade. The resulting data then indicates fictitiously high levels of apparent abrasion resistance not realized in actual service.

Accordingly, representative objects of the present invention are to provide an apparatus and method for determining the abrasion resistance of materials which yield accurate, reliable and reproducible data for determining actual service life.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, as exemplified in the following disclosure, and the scope of the invention will be indicated in the claims.

SUMMARY OF THE INVENTION

The present invention relates to an apparatus and method for determining the abrasion resistance of materials. More particularly, it relates to the determination of the relative abrasion resistance of pairs of materials subjected to both reciprocal and rotary abrasive action. This is accomplished in the apparatus of the invention by placing pairs of test samples in contact and with a particulate abrasive between their contacting surfaces. The test samples may be of similar or completely dissimilar materials depending upon the comparison to be made. One sample is rotated while the other is simultaneously reciprocated to produce the desired abrasive action. At the end of testing, the samples are compared as to weight loss or dimensional change to determine their relative abrasion resistance, the sample showing the least change generally having the better abrasion resistance.

It has been found that the combination of both rotary and reciprocal abrasive motion yields test results which more accurately reflect the life of the material samples under actual conditions of service. This is particularly true in the case of elastomers such as rubber. One reason for increased accuracy is that the surfaces of the samples to be compared are rubbed against each other and a common abrasive material. Thus, test variables such as machine speed, pressure, the degree of clogging of the abrasive, etc., are identical for each of the samples in a pair so that precise and reproducible comparative data is obtained.

The apparatus of the invention also includes abrasive feed means for periodically introducing fresh abrasive between the sample surfaces to replace that lost and/or clogged with abraded particles. This adds to the accuracy, and to the correlation of the test results with actual service conditions. The feeding of abrasive may be automatically controlled as to frequency and amount.

In addition, means are provided in the apparatus for controlling such conditions as the sample temperatures, the pressure between samples and the abrading rate, to permit the testing of materials of varying physical properties.

BRIEF DESCRIPTION OF THE DRAWINGS

For a fuller understanding of the nature and objects of the invention, reference should be had to the following detailed description taken in connection with the accompanying drawings, in which:

FIG. 2A is an enlarged sectional view taken along line 2A—2A of FIG. 2.

FIG. 4 is a schematic representation of the automatic control mechanism of the invention.

Similar reference characters refer to similar parts throughout the several views of the drawings.

DESCRIPTION OF THE PREFERRED EMBODIMENTS

Figure 1:
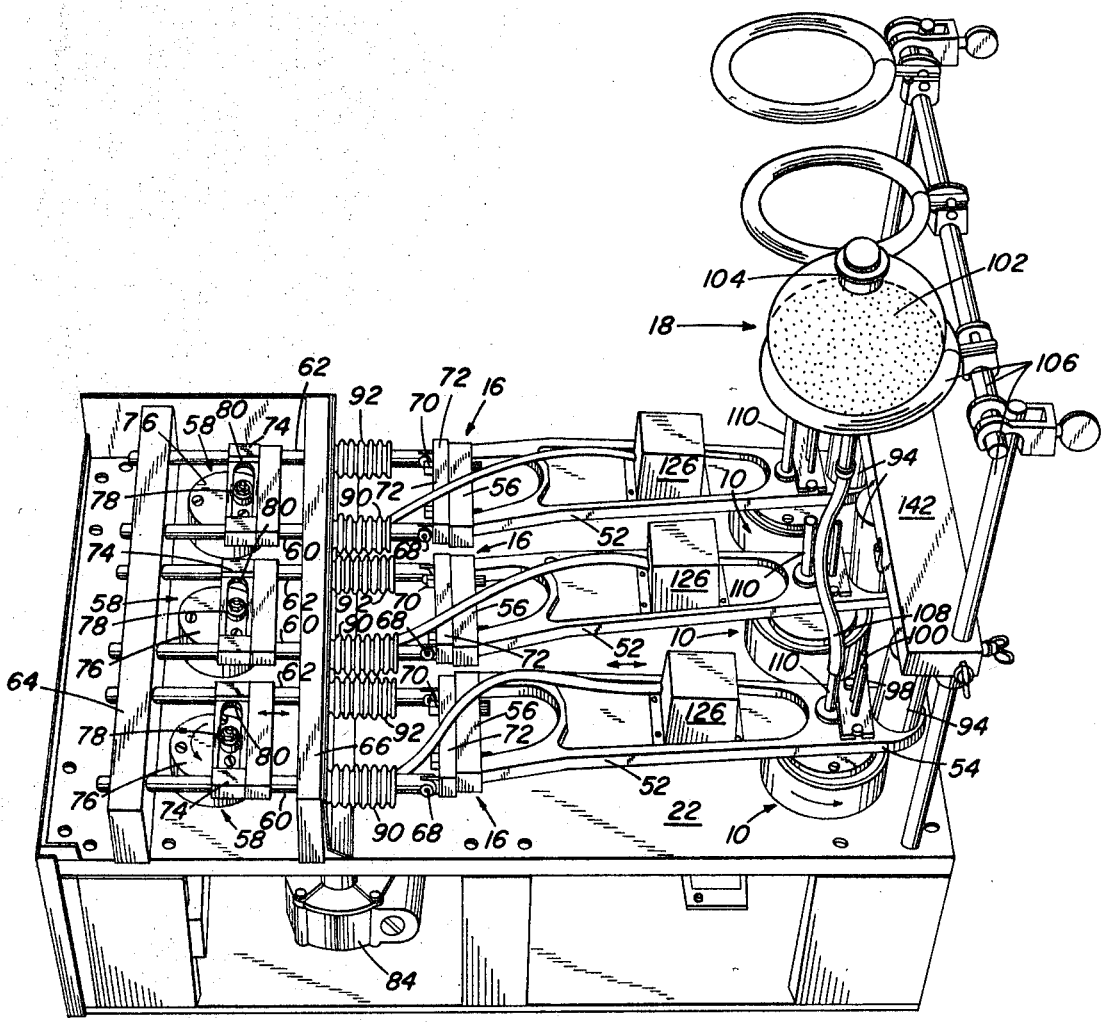
FIG. 1 is a top perspective view of the abrasion testing apparatus of the invention.

Referring now to FIG. 1, there is shown apparatus capable of simultaneously performing three tests of relative abrasion resistance. It will be understood, however, that the apparatus can be constructed to perform only one, or more than three tests at a time without departing from the scope of the invention. For simplicity, the apparatus will be described in detail only as to the testing of one pair of samples since the duplicate means for performing simultaneous tests function in a similar manner.

Figure 2:
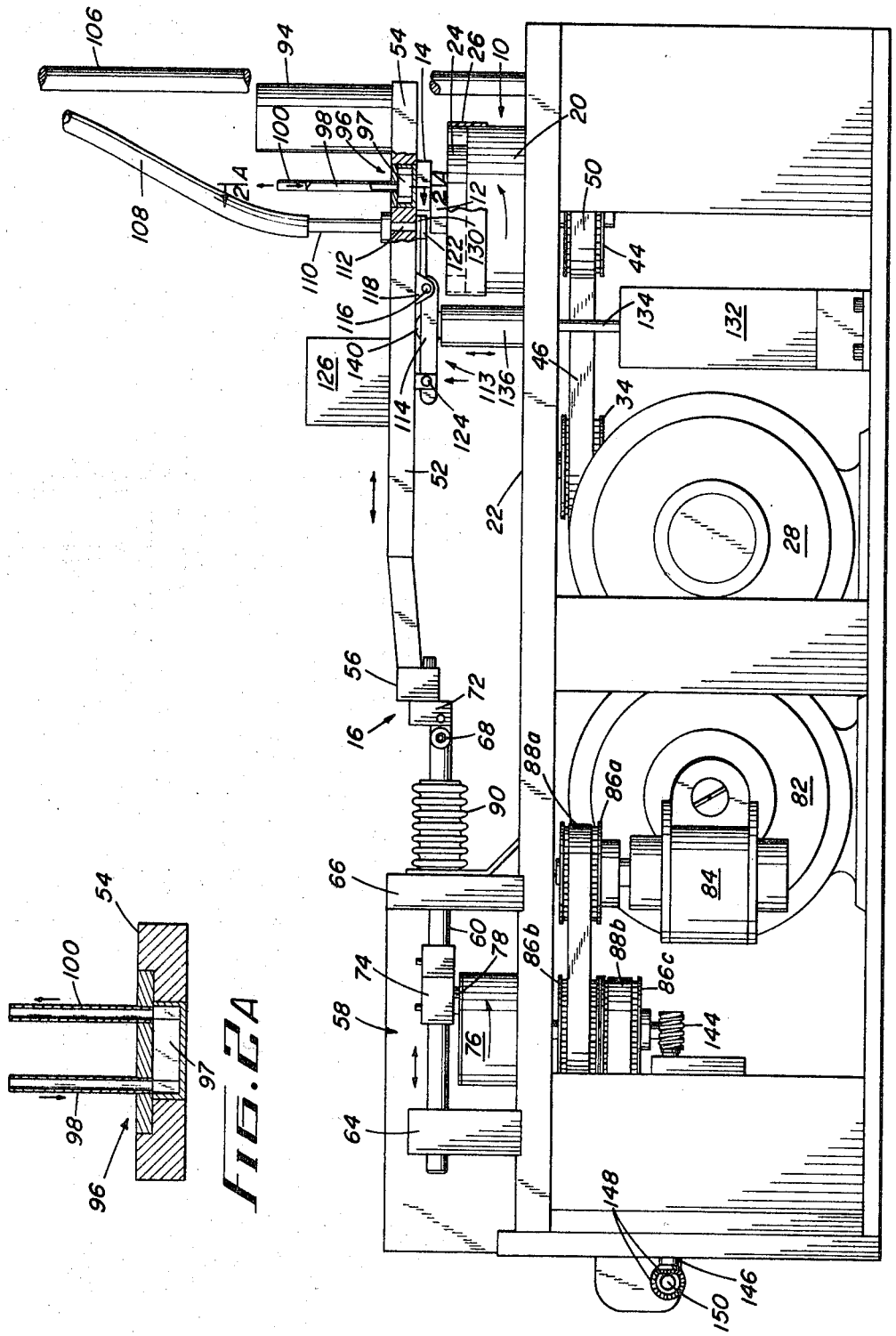
FIG. 2 is an enlarged side elevation view of the apparatus of FIG. 1 shown partly in section.

In general, the apparatus comprises a rotatable table 10 upon which a first sample 12 to be tested is mounted as shown in FIG. 2. A second sample 14 is mounted on a reciprocal arm assembly 16 in contact with the first sample 12. To provide the necessary abrasive rubbing action between the contacting surfaces of samples 12 and 14, table 10 is rotated and arm assembly 16 is reciprocated as shown by the arrows in FIGS. 1 and 2.

The apparatus is constructed for short term abrasion testing from which the actual service life of samples can be determined. To accomplish this, abrasion between the contacting surfaces of samples 12 and 14 must normally be accelerated. For this purpose a particulate abrasive is periodically fed, in a manner more fully described below, from a supply 18 (FIG. 1) to between the contacting surfaces of samples 12 and 14. After a predetermined number of apparatus cycles, the samples are removed and their respective losses of weight or dimensional changes are compared to determine their relative abrasion resistance. If the actual abrasive service life of one sample is known, the service life of the other sample can then also be estimated.

Specifically, referring to FIG. 2, rotatable table 10 comprises a turntable 20 mounted on the apparatus frame 22. A suitable fixture 24 such as a chuck, clamp or the like is mounted on turntable 20 to hold sample 12. A skirt 26 is provided around the upper end of a turntable 20 to catch the excess abrasive ejected from between samples 12 and 14 in the course of testing.

Figure 3:
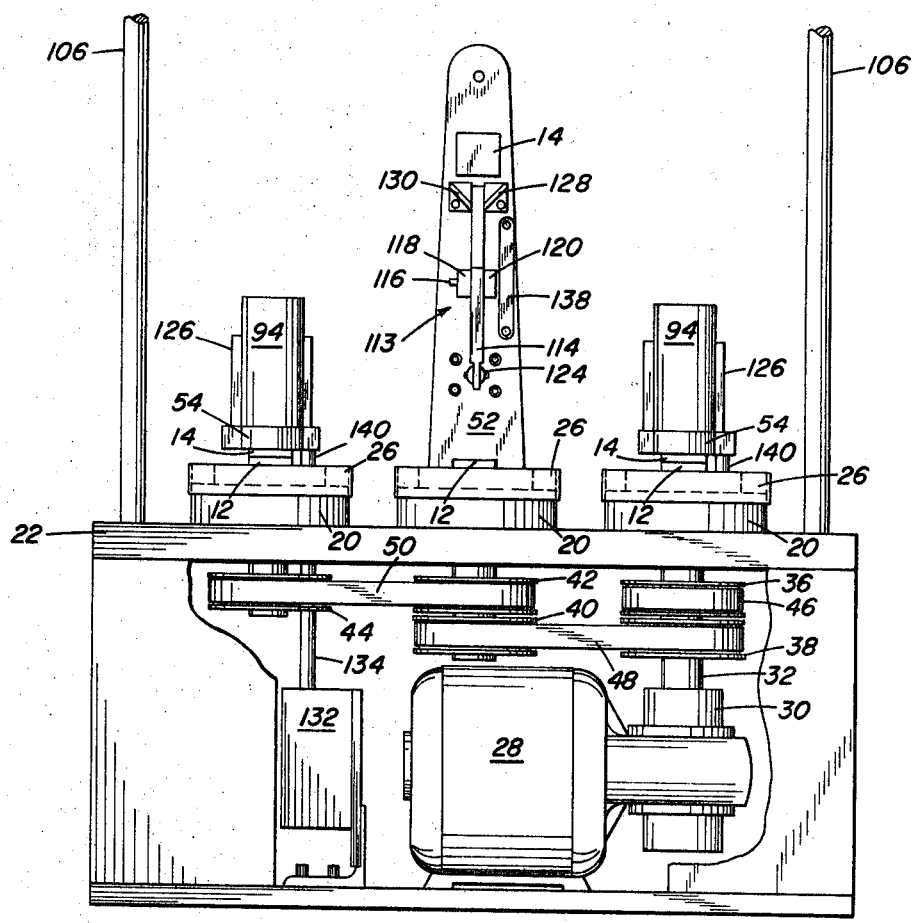
FIG. 3 is an enlarged front elevation view of the apparatus of FIG. 1 with the center reciprocal arm pivoted upward to show the structure thereof.

As shown in FIG. 3, each turntable 20 is turned by a motor 28 acting through a suitable reduction gear 30. The rotary motion of the shaft 32 of reduction gear 30 is transmitted to the turntables 20 by a train of pulleys, respectively 34, 36, 38, 40, 42 and 44, interconnected by a series of belts, respectively 46, 48 and 50 (FIGS. 2 and 3). Reduction gear 30 is preferably adjustable to provide for the different rotational speeds which may be required for different test sample materials. In general, rotational speeds of about 20 to about 250 revolutions per minute are adequate for most materials. In the case of rubber or similar elastomers, a rotational speed in the order of 100 revolutions per minute has been found satisfactory.

Referring again to FIG. 1, reciprocal arm assembly 16 comprises an elongated arm 52 having one end 54 extending over the turntable 20 of rotatable table 10. As shown in FIG. 2, sample 14 is mounted to end 54 of arm 52 on a suitable fixture such as a chuck, clamp or the like, directly over sample 12 on table 10.

The opposite end 56 of arm 52 is mounted to a reciprocating mechanism 58 shown in FIGS. 1 and 2. Mechanism 58 comprises a pair of parallel slide bars 60 and 62 loosely mounted through a pair of bearing blocks 64 and 66 extending across the top of apparatus frame 22. Slide bars 60 and 62 are connected at one end by hinges 68 and 70 to mounting block 72 which, in turn, is secured by bolts or the like to end 56 of arm 52. A slotted crosshead 74 interconnects and is fixedly secured to slide bars 60 and 62 between bearing blocks 64 and 66. Rotatable crank wheels 76 carrying eccentrically mounted crank pins 78 are mounted on apparatus frame 22 under crosshead 74 with crank pin 78 extending into the slot 80 thereof. It can be seen that as crank wheel 76 rotates, as shown in FIG. 1, the eccentric motion of crank pin 7 causes cross-head 74, and thus slide bars 60 and 62 an arm 52, to reciprocate in the direction shown by th arrows.

Referring to FIG. 2, the three crank wheels 76 shown are driven by a motor 82 acting through a reduction gear 84. Reduction gear 84 drives a train of pulleys 86a, 86b, 84c, etc. interconnected by belts 88a, 88b, etc., all mounted below the apparatus frame 22. It can be seen that the drive for reciprocating mechanism 58 is similar in construction and function to that more fully described with respect to turntables 20. Reduction gear 84 is also preferably adjustable to provide for varying rates of reciprocation for different test sample materials. The rate of reciprocation may vary widely, for example from about 30 to 1,000 strokes per minute, depending on the types of materials being tested. About 100 to about 115 strokes per minute has been found to be a suitable reciprocation rate for most rubbers or similar elastomers. Also reciprocation need not occur along a single axis as shown but may vary angularly from stroke to stroke.

As shown in FIGS. 1 and 2, a pair of flexible bellows 90 and 92 of rubber or similar elastomer are preferably mounted on each pair of slide bars 60 and 62 between reciprocating mechanism 58 and test samples 12 and 14. These keep abrasive and abraded particles from being carried into the moving parts of mechanism 58 on slide bars 60 and 62 and thus serve to cut down on the amount of abrasive wear thereon.

The amount of pressure exerted between the contacting surfaces of samples 12 and 14 is controlled by a removable weight 94 (FIGS. 1 and 2) mounted on the top of end 54 of arm member 62. Weights of varying size or multiple weights may be used to achieve the desired pressure between the samples. Generally, the amount of weight used will vary from the weight of the arm alone, which is preferably about 500 grams, up to about 3,000 grams. For rubber or similar elastomers, a total weight of about 1,500 grams has been found satisfactory for samples about 1 inch square.

Means may also be provided to vary the temperature of the samples. Thus it is possible to simulate abrasive conditions at high or low temperatures such as often occur in service. Referring to FIG. 2, an insert 96 containing a hollow chamber 97 is provided in arm 52 just behind the area to which sample 14 is mounted. A pair of delivery tubes 98 and 100 (FIG. 2A) are tightly secured to insert 96 and are in communication with the interior of chamber 97. Tubes 98 and 100 carry heated or cooled fluids in and out of chamber 97 to effect the desired change of temperature in the samples being tested.

As shown in FIG. 1, the particulate abrasive 102 employed to accelerate testing may be any one or a mixture of a number of common abrasive materials including burstone, emery, garnet, infusorial earth, pumice, silicon carbide or the like. A particularly effective abrasive for testing rubber or the like is corundum or Carborundum. The mesh size of these particulate materials may vary from about 20 to about 500 mesh with about 200 to 400 mesh being most effective for most rubber or like elastomer testing.

As shown in FIGS. 1 and 2, abrasive 102 is gravity fed from a container 104 (only one shown for clarity) mounted on a support frame 106 over the testing apparatus. A flexible tube 108 carries abrasive into a tubular fitting 110 connected to arm 52. Arm 52 is perforated to form an opening 112 below fitting 110 (FIG. 2) so that the abrasive can flow therethrough. The flow of abrasive, however, does not occur continuously, but is controlled by a feed valve 113 shown in FIGS. 2 and 3.

Feed valve 113 comprises a valve arm 114 pivotally mounted on a pin 116 secured in flanges 118 and 120 projecting from the bottom of arm 52. One end of valve arm 114 preferably carries a resilient pad 122 which serves to close opening 112 when valve arm 114 is in the closed position shown in FIG. 2. The other end of valve arm 114 is secured to the armature 124 of a solenoid 126 mounted on arm 52. The actuation of solenoid 126 causes armature 124 to be drawn up (arrow FIG. 2) thus pivoting valve arm 114 to an open position to release the flow of abrasive 102 through opening 112. The abrasive flow is directed to its intended position between the contacting surfaces of samples 12 and 14 by a pair of guide flanges 128 and 130 disposed to form a V (FIG. 3) on the underside of arm 52 about opening 112.

The abrasive to be effective is introduced between the contacting surfaces of test samples 12 and 14, and the test samples are separated for this purpose. The mechanism for separating samples 12 and 14 is shown in FIG. 2. A solenoid 132 mounted below apparatus frame 22 has an armature 134 extending up through frame 22 and connected to a plunger 136 positioned just below arm 52. The top of plunger 136 is aligned with a wear plate 138 (FIG. 3) on the bottom surface of arm member 52 and is provided with a roller 140 (FIG. 4) to reduce friction. Upon actuation of solenoid 132, roller 140 presses against wear plate 138 causing upward pivotal movement of arm member 52 about its hinges 68 and 70 and separating samples 12 and 14 as shown in FIG. 4. The separation need only be slight, that is just sufficient to permit the introduction of abrasive between the contacting surfaces and preferably is kept slight to speed up the operation of the abrasion testing apparatus. As shown in FIG. 1, the upward motion of arm 52 may be limited in extent by means of a stop bar 142 adjustably mounted over the apparatus on support frame 106. Stop bar 142 limits the upward movement of arm 52 by providing a barrier which weight 94 on arm 52 contacts after a predetermined vertical movement.

OPERATION

The operation of the abrasion testing apparatus is automatically controlled by an electromechanical system which is coordinated with the rate of reciprocation of arm 16 as shown in FIGS. 2 and 4. A worm gear linkage 144 drives a shaft 146 at a rate governed by the rate of revolution of crank wheel 76. Shaft 146 is connected in turn through gearing 148 to the cam shaft 150 of the control system. The further operation of the control system is illustrated schematically in FIG. 4. A pair of cams 152 and 154 are journaled to cam shaft 150 and respectively operate microswitches 156 and 158; these in turn act through relays 160 to actuate solenoids 126 and 132. As discussed above, solenoids 126 and 132 respectively control the abrasive feed and the raising of arm assembly 16.

In general, one pair of cams as described above with their associated circuitry are used for each arm assembly 16 in the testing apparatus. The cams are preferably adjustable so that the frequency and duration of operation of microswitches 156 and 158, and thus the actuation of solenoids 126 and 132 can be varied to suit the desired test conditions.

In a typical abrasion test of, for example rubber, microswitches 156 and 158 are triggered every third cycle (a cycle being one forward and one backward stroke) of arm assembly 16. As shown in FIG. 4, when arm assembly 16 reaches the end of its third forward stroke, samples 12 and 14 are preferably just barely overlapped. At this point cam 154 triggers microswitch 158 actuating solenoid 132 to raise arm assembly 16 slightly as shown. Substantially simultaneously, cam 152 triggers microswitch 156 to actuate solenoid 126 and open feed valve 113 allowing abrasive to feed down onto the surface of sample 14. Feed valve 113 is maintained open only long enough to insure the introduction of the desired quantity of abrasive. This quantity may vary depending upon the type of materials being tested. In the case of rubber or similar elastomers, the amount of abrasive may vary from about .05 to about .34 gram and is preferably maintained at about .15 gram for a one inch square sample. Microswitches 156 and 158 are then allowed to close, shutting feed valve 113 and dropping arm assembly 16 which has at this point started its backward stroke. Samples 12 and 14 are thus brought into contact and act to spread out the abrasive between their contacting surfaces. The process then continues for three more strokes at which point the sequence described above repeats. In this manner, the apparatus of the invention can continuously and automatically operate for any predetermined number of cycles to provide accurate and reproducible data on relative abrasion resistance.

EXAMPLE I

To illustrate the accuracy of test results obtained with the apparatus of the invention, three samples of nitrile rubber stock were tested to determine their suitability for use as shaft seals. The samples were cured for eight minutes at 340° F. and then equilibrated for four days in the testing room. The samples were then simultaneously tested on the apparatus of the invention using Carborundum abrasive for 35,400 cycles. The results of this testing are shown in Table I:

TABLE I

| Sample number: | Grams of rubber lost |
|---|---|
| 1 | 0.0152 |
| 2 | 0.0178 |
| 3 | 0.0219 |

The results indicate that sample 1 should be the best material for a shaft seal on the basis of average wear.

Samples of the same rubber described above were then tested in accordance with standards of the National Bureau of Standards (herein NBS test). The results of such testing are shown in Table II:

TABLE II

| | Cycles to abrade 0.1 inch | |
|---|---|---|
| | 1st run | 2nd run |
| Sample number: | | |
| 1 | 227 | 251 |
| 2 | 238 | 226 |
| 3 | 211 | 234 |

The results of the NBS test are inconclusive and the differences between successive runs are as large as the differences between the various samples. Thus, the NBS test does not predict which sample will perform best as a shaft seal. Actual service tests of these same rubber samples indicate that sample 1 is in fact best for shaft seal use as predicted by the test of the invention.

EXAMPLE II

Three samples of polyurethane rubber were prepared with differing amounts or types of curatives. The samples were then tested by abrading each one against the others in the apparatus of the invention and compared as to weight loss to produce a wear ratio, i.e., a ratio of the weight losses of each sample in grams. The results of relative abrasion resistance are shown in Table III:

TABLE III

| Samples abraded: | Wear ratio found |
|---|---|
| $P_1/P_2$ | 0.98 |
| $P_2/P_3$ | 0.75 |
| $P_1/P_3$ | 0.70 |

These results show that samples $P_1$ and $P_2$ have approximately equal wear resistance, while sample $P_3$ has inferior wear resistance to either sample $P_1$ or $P_2$. To check the accuracy and reproducibility of the test, sample $P_3$ was again tested against samples $P_1$ and $P_2$. Sample $P_3$ would be expected to illustrate approximately the same relative abrasion resistance when compared with either sample $P_1$ or $P_2$ and this was found to be the case.

Testing of the three samples described above by the NBS test method failed to show demonstrable differences between samples $P_1$, $P_2$ and $P_3$.

EXAMPLE III

An acrylic elastomer was tested in accordance with the invention against each of the samples $P_1$, $P_2$ and $P_3$ described in Example II, and a comparison made as to relative weight loss. The results are shown as a wear ratio in Table IV. Included also in Table IV are typical results achieved with NBS test procedures.

TABLE IV

| Invention | | NBS test | |
|---|---|---|---|
| Acrylate against | Wear ratio acrylate/P | Cycles to abrade 0.1 inch, acrylate 350 | Relative wear, acrylate/P |
| $P_1$ | 14.7 | $P_1$ 1,100-1,200 | 3.5 |
| $P_2$ | 13.2 | $P_2$ 1,100-1,200 | 3.5 |
| $P_3$ | 8.9 | $P_3$ 1,100-1,200 | 3.5 |

All results show that the relative abrasion resistance of the acrylic elastomer is considerably less than that of the polyurethane rubbers. The test of the invention, however, shows the abrasion resistance of the polurethane rubbers to be much better than is shown by the NBS test. Also, the correlation of the wear ratio data of Table IV with that of Table III is good, further indicating the accuracy and reproducibility of the test of the invention. The corresponding NBS test shows no difference in relative abrasion resistance for samples $P_1$, $P_2$ and $P_3$.

Service test data for the acrylic elastomer and polyurethane rubbers tested herein indicate that their actual resistances to abrasion are much more nearly in accordance with the data obtained with the present invention than with the NBS data set forth above.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Abrasion testing apparatus for determining abrasion resistance, particularly of elastomeric materials, comprising, in combination:
   (A) a rotatable table for supporting a first sample of a material to be tested,
   (B) means for continuously rotating said table,
   (C) a reciprocable arm adjacent said table for supporting a second sample of a material to be tested in contact with the first sample,
   (D) means for reciprocating said arm,
   (E) means for moving said arm relative to said table at predetermined intervals to separate the first and second samples,
   (F) abrasive feed means for introducing an abrasive material between the first and second samples upon separation thereof, and
   (G) automatic control means for actuating both said arm and said abrasive feed means to provide fresh abrasive between the samples at said predetermined intervals.

2. Abrasion testing apparatus for determining abrasion resistance, particularly of elastomeric materials, comprising, in combination:
   (A) a continuously rotatable table for supporting a first sample of a material to be tested,
   (B) means for continuously rotating said table,
   (C) a reciprocable arm adjacent said table with means thereon for supporting a second sample of a material to be tested in contact with the first sample,
   (D) means for reciprocating said arm,
   (E) means automatically providing relative movement between said arm and said table at predetermined intervals to separate the first and second samples, and
   (F) abrasive feed means actuated upon separation of the samples to introduce abrasive therebetween while said samples are separated.

3. Apparatus as defined in claim 2 having a plurality of said tables, corresponding arms and associated means for the simultaneous testing of a plurality of pairs of material samples.

4. Apparatus as defined in claim 2 including means for imparting to the samples a temperature above or below the ambient temperature of said apparatus whereby data on high and low temperature abrasion resistance can be obtained.

5. Abrasion testing apparatus for determining the abrasion resistance, of materials, comprising, in combination:
   (A) a rotatable table for supporting a first sample of a material to be tested,
   (B) means for rotating said table,
   (C) a reciprocable arm adjacent said table for supporting a second sample of a material to be tested in contact with the first sample,
      (1) said arm being pivotably mounted to move away from said table to separate the samples,
   (D) means for reciprocating said arm to reciprocate the second sample in contact with the first sample,
   (E) first actuating means for pivoting said arm away from said table,
   (F) abrasive feed means for feeding abrasive between the contacting surfaces of the first and second samples,
   (G) second actuating means for initiating the flow of abrasive through said abrasive feed means, and
   (H) automatic control means for triggering said first and second actuating means at predetermined intervals whereby said arm is pivoted to separate the samples and fresh abrasive is introduced therebetween.

6. A method of determining abrasion resistance, particularly of elastomeric materials, comprising, in combination, the steps of:
   (A) placing a pair of samples of the materials to be tested in face-to-face contact,
   (B) reciprocating a first said sample against the face of the second said sample while said second sample is continuously rotated in contact with the face of said first sample,
   (C) introducing at predetermined intervals an abrasive between said contacting faces of said samples, and
   (D) measuring after a predetermined period of time the respective weight losses or dimensional changes of said pair of samples.

7. A method as defined in claim 6 wherein at said predetermined intervals said first and second samples are separated and fresh abrasive is introduced between said contacting faces thereof.

References Cited

UNITED STATES PATENTS

| 1,906,175 | 4/1933 | Millet | 73—7 |
| 2,037,939 | 4/1936 | Spring et al. | 73—9 |
| 3,087,326 | 4/1963 | MacDonnell | 73—7 |
| 3,430,480 | 3/1969 | Pandell et al. | 73—7 |

FOREIGN PATENTS

| 6,406,271 | 6/1964 | Netherlands | 73—7 |
| 200,267 | 9/1967 | U.S.S.R. | 73—7 |

LOUIS R. PRINCE, Primary Examiner

D. M. YASICH, Assistant Examiner